United States Patent [19]
Weaver et al.

[11] Patent Number: 5,839,510
[45] Date of Patent: *Nov. 24, 1998

[54] CONTROL OF PARTICULATE FLOWBACK IN SUBTERRANEAN WELLS

[75] Inventors: Jim D. Weaver; Philip D. Nguyen; James R. Stanford, all of Duncan; Bobby K. Bowles, Comanche; Steven F. Wilson, Duncan; R. Clay Cole, Dunacn; Mark A. Parker, Duncan; Brahmadeo T. Dewprashad, Norman, all of Okla.

[73] Assignee: Halliburton Energy Services, Inc., Duncan, Okla.

[ * ] Notice: The term of this patent shall not extend beyond the expiration date of Pat. No. 5,697,440.

[21] Appl. No.: 783,050

[22] Filed: Jan. 14, 1997

Related U.S. Application Data

[63] Continuation-in-part of Ser. No. 725,368, Oct. 3, 1996, Pat. No. 5,787,986, which is a continuation-in-part of Ser. No. 510,399, Aug. 2, 1995, Pat. No. 5,582,249, which is a continuation-in-part of Ser. No. 412,668, Mar. 29, 1995, Pat. No. 5,501,274.

[51] Int. Cl.$^6$ .......................... E21B 33/138; E21B 43/04; E21B 43/267
[52] U.S. Cl. .......................... 166/276; 166/280; 166/281; 166/295; 507/924; 523/131
[58] Field of Search ...................................... 166/276, 280, 166/281, 295, 300; 507/924; 523/131

[56] References Cited

U.S. PATENT DOCUMENTS

| | | |
|---|---|---|
| 2,187,895 | 1/1940 | Sanders . |
| 2,823,753 | 2/1958 | Henderson et al. ................ 166/276 X |
| 3,149,673 | 9/1964 | Pennington . |
| 3,363,690 | 1/1968 | Fischer . |
| 3,443,637 | 5/1969 | Sparlin et al. ........................... 166/295 |
| 3,659,651 | 5/1972 | Graham . |
| 3,815,680 | 6/1974 | McGuire et al. ....................... 166/281 |
| 3,973,627 | 8/1976 | Hardy et al. . |
| 3,976,135 | 8/1976 | Anderson ................................ 166/276 |
| 4,494,605 | 1/1985 | Wiechel et al. . |
| 4,829,100 | 5/1989 | Murphey et al. .................... 166/295 X |
| 5,330,005 | 7/1994 | Card et al. . |
| 5,439,055 | 8/1995 | Card et al. . |
| 5,501,274 | 3/1996 | Nguyen et al. . |
| 5,501,275 | 3/1996 | Card et al. . |
| 5,551,514 | 9/1996 | Nelson et al. . |
| 5,582,249 | 12/1996 | Caveny et al. .......................... 166/276 |
| 5,652,296 | 7/1997 | Randen . |
| 5,697,440 | 12/1997 | Weaver et al. .......................... 166/281 |
| 5,721,302 | 2/1998 | Wood et al. . |
| 5,723,538 | 3/1998 | Fischer . |

*Primary Examiner*—George Suchfield
*Attorney, Agent, or Firm*—Robert A. Kent

[57] ABSTRACT

The present invention provides a method of treating a subterranean formation with a particulate laden fluid whereby particulate flowback is reduced or prevented. The method includes the steps of providing a fluid suspension including a mixture of a particulate, a tackifying compound and a hardenable resin, pumping the suspension into a subterranean formation and depositing the mixture within the formation whereby the tackifying compound retards movement of at least a portion of the particulate within the formation upon flow of fluids from the subterranean formation and said hardenable resin subsequently consolidates at least a portion of said particulate within said formation.

25 Claims, No Drawings

CONTROL OF PARTICULATE FLOWBACK IN SUBTERRANEAN WELLS

CROSS-REFERENCE TO RELATED APPLICATIONS

The present Application is a Continuation-in-part of U.S. application Ser. No. 08/725,368, filed Oct. 3, 1996, now U.S. Pat. No. 5,787,986, which is a Continuation-in-Part of U.S. application Ser. No. 08/510,399, filed Aug. 2, 1995, now U.S. Pat. No. 5,582,249, which is a Continuation-in-Part of U.S. application Ser. No. 08/412,668 filed Mar. 29, 1995, now U.S. Pat. No. 5,501,274.

BACKGROUND OF THE INVENTION

1. Field of the Invention

This invention relates to means for recovering hydrocarbons from a subterranean formation and more particularly to a method and means for controlling particulate solids transport during the production of hydrocarbons from a subterranean formation.

2. Brief Description of the Prior Art

Transport of particulate solids during the production of hydrocarbons from a subterranean formation is a continuing problem. The transported solids can erode or cause significant wear in the hydrocarbon production equipment used in the recovery process. The solids also can clog or plug the wellbore thereby limiting or completely stopping fluid production. Further, the transported particulates must be separated from the recovered hydrocarbons adding further expense to the processing.

The particulates which are available for transport may be present due to an unconsolidated nature of a subterranean formation and/or as a result of well treatments placing particulates in a wellbore or formation, such as, by gravel packing or propped fracturing.

In the treatment of subterranean formations, it is common to place particulate materials as a filter medium and/or a proppant in the near wellbore area and in fractures extending outwardly from the wellbore. In fracturing operations, proppant is carried into fractures created when hydraulic pressure is applied to these subterranean rock formations to a point where fractures are developed. Proppant suspended in a viscosified fracturing fluid is carried outwardly away from the wellbore within the fractures as they are created and extended with continued pumping. Upon release of pumping pressure, the proppant materials remain in the fractures holding the separated rock faces in an open position forming a channel for flow of formation fluids back to the wellbore.

Proppant flowback is the transport of proppants back into the wellbore with the production of formation fluids following fracturing. This undesirable result causes undue wear on production equipment, the need for separation of solids from the produced hydrocarbons and occasionally also decreases the efficiency of the fracturing operation since the proppant does not remain within the fracture and may limit the width or conductivity of the created flow channel. Proppant flowback often may be a aggravated by what is described as "aggressive" flowback of the well after a stimulation treatment. Aggressive flowback generally entails flowback of the treatment fluid at a rate of from about 0.001 to about 0.1 barrels per minute (BPM) per perforation of the treatment fluids which were introduced into the subterranean formation. Such flowback rates accelerate or force closure of the formation upon the proppant introduced into the formation. The rapid flowrate can result in large quantities of the proppant flowing back into the wellbore before closure occurs or where inadequate bridging within the formation occurs. The rapid flowback is highly desirable for the operator as it returns a wellbore to production of hydrocarbons significantly sooner than would result from other techniques.

Currently, the primary means for addressing the proppant flowback problem is to employ resin-coated proppants or resin consolidation of the proppant which are not capable of use in aggressive flowback situations. Further, the cost of resin-coated proppant is high, and is therefore used only as a tail-in in the last five to twenty five percent of the proppant placement. Resin-coated proppant is not always effective since there is some difficulty in placing it uniformly within the fractures. Another means showing reasonable effectiveness has been to gradually release fracturing pressure once the fracturing operation has been completed so that fracture closure pressure acting against the proppant builds slowly allowing the proppant particles to stabilize before flowback of the fracturing fluid and the beginning of hydrocarbon production. Such slow return is undesirable, however, since it reduces the production from the wellbore until the treatment fluid is removed.

In unconsolidated formations, it is common to place a filtration bed of gravel in the near-wellbore area in order to present a physical barrier to the transport of unconsolidated formation fines with the production of hydrocarbons. Typically, such so-called "gravel packing operations" involve the pumping and placement of a quantity of gravel and/or sand having a mesh size between about 10 and 60 mesh on the U.S. Standard Sieve Series into the unconsolidated formation adjacent to the wellbore. It is sometimes also desirable to bind the gravel particles together in order to form a porous matrix through which formation fluids can pass while straining out and retaining the bulk of the unconsolidated sand and/or fines transported to the near wellbore area by the formation fluids. The gravel particles may constitute a resin-coated gravel which is either partially cured and subsequently completes curing or can be cured by an overflush of a chemical binding agent once the gravel is in place. It has also been known to add various hardenable binding agents or hardenable adhesives directly to an overflush of unconsolidated gravel in order to bind the particles together.

U.S. Pat. Nos. 5,330,005, 5,439,055 and 5,501,275 disclose a method for overcoming the difficulties of resin coating proppants or gravel packs by the incorporation of a fibrous material in the fluid with which the particulates are introduced into the subterranean formation. The fibers generally have a length ranging upwardly from about 2 millimeters and a diameter of from about 6 to about 200 microns. Fibrillated fibers of smaller diameter also may be used. The fibers are believed to act to bridge across constrictions and orifices in the proppant pack and form a mat or framework which holds the particulates in place thereby limiting particulate flowback. The fibers typically result in a 25 percent or greater loss in permeability of the proppant pack that is created in comparison to a pack without the fibers.

While this technique may function to limit some flowback, it fails to secure the particulates to one another in the manner achieved by use of resin coated particulates.

U.S. Pat. No. 5,501,274 discloses a method for reducing proppant flowback by the incorporation of thermoplastic material in particulate, ribbon or flake form with the proppant. Upon deposition of the proppant and thermoplastic material in the formation, the thermoplastic material softens and causes particulates adjacent the material to adhere to the thermoplastic creating agglomerates. The agglomerates then bridge with the other agglomerates and other particulates to prevent flowback from the formation.

It would be desirable to provide a more permanent method which will bind greater numbers of particles of the particulate to one another whereby agglomerates may be formed which would further assist in preventing movement or flowback of particulates from a wellbore or formation without significantly reducing the permeability of the particulate pack during aggressive flowback of treatment fluids.

BRIEF SUMMARY OF THE INVENTION

The present invention provides a method and fluid for treating a subterranean formation and a resultant porous particulate pack that inhibits the flow of particulates back through the wellbore during the production of hydrocarbons without significant effects upon the permeability of the particulate pack.

In accordance with the invention, a method of treating a subterranean formation penetrated by a wellbore is provided comprising the steps of providing a fluid suspension including a mixture of particulate material, a material comprising a liquid or solution of a tackifying compound, which coats at least a portion of the particulate upon admixture therewith, and a hardenable resin, which coats or is coated upon at least a portion of the particulate, pumping the fluid suspension including the coated particulate through the wellbore and depositing the mixture in the formation. Upon deposition of proppants having been coated with the tackifying compound and resin material mixture in the formation the coating causes particulate adjacent to the coated material to adhere to the coated material thereby creating proppant agglomerates which bridge against other particles in the formation to minimize initial particulate flowback and the hardenable resin subsequently consolidates the particulate before and during flowback.

The coated material is effective in inhibiting the flowback of particulate in a porous pack having a size ranging from about 2 to about 400 mesh in intimate admixture with the tackifying compound and hardenable resin coated particulates.

The coated material is effective in consolidating particulate into the form of agglomerates in a formation as a result of a fracturing or gravel packing treatment performed on a subterranean formation during aggressive flowback of the treatment fluid.

DETAILED DESCRIPTION OF THE INVENTION

In accordance with the present invention, a liquid or solution of a tackifying compound is incorporated in an intimate mixture with a particulate material such as conventional proppants or gravel packing materials together with a hardenable resin and introduced into a subterranean formation.

As used in this specification, the term "intimate mixture" will be understood to mean a substantially uniform dispersion of the components in the mixture. The term "simultaneous mixture" will be understood to mean a mixture of components that are blended together in the initial steps of the subterranean formation treatment process or the preparation for the performance of the treatment process.

The coated particulate or proppant material may comprise substantially any substrate material that does not undesirably chemically interact with other components used in treating the subterranean formation. The material may comprise sand, ceramics, glass, sintered bauxite, resin coated sand, resin beads, metal beads and the like. The coated material also may comprise an additional material that is admixed with a particulate and introduced into a subterranean formation to reduce particulate flowback. In this instance the additional substrate material may comprise glass, ceramic, carbon composites, natural or synthetic polymers or metal and the like in the form of fibers, flakes, ribbons, beads, shavings, platelets and the like. In this instance, the additional substrate material generally will be admixed with the particulate in an amount of from about 0.1 to about 5 percent by weight of the particulate. The tackifying compound comprises a liquid or a solution of a compound capable of forming at least a partial coating upon the substrate material with which it is admixed prior to or subsequent to placement in the subterranean formation. In some instances, the tackifying compound may be a solid at ambient surface conditions and upon initial admixing with the particulate and after heating upon entry into the wellbore for introduction into the subterranean formation become a melted liquid which at least partially coats a portion of the particulate. Compounds suitable for use as a tackifying compound comprise substantially any compound which when in liquid form or in a solvent solution will form a non-hardening coating, by themselves, upon the particulate which facilitates agglomeration and will increase the continuous critical resuspension velocity of the particulate when contacted by a stream of water as hereinafter described in Example I by at least about 50 percent over the particulate alone when present in a 0.5 percent by weight active material concentration and increase the initial critical resuspension velocity by at least about 50 percent over the particulate alone. Preferably, the continuous critical resuspension velocity is increased by at least 100 percent over particulate alone and most preferably at least about 150 percent over particulate alone and the initial critical resuspension velocity is increased by at least 75 percent and most preferably at least 100 percent over particulate alone. A particularly preferred group of tackifying compounds comprise polyamides which are liquids or in solvent solution at the temperature of the subterranean formation to be treated such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of $C_{36}$, dibasic acids containing some trimer and higher oligomers and also small amounts of monomer acids which are reacted with polyamines. Other polyacids include trimer acids, synthetic acids produced from fatty acids, maleic anhydride and acrylic acid and the like. Such acid compounds are available from companies such as Witco, Union Camp, Chemtall, and Emery Industries. The reaction products are available from, for example, Champion Chemicals, Inc. and Witco.

In general, the polyamides of the present invention are commercially produced in batchwise processing of polyacids predominately having two or more acid functionalities per molecule with a polyamine. As is well known in the manufacturing industry, the polyacids and polyfunctional amines are introduced into a reactor where, with agitation, the mildly exothermic formation of the amine salt occurs. After mixing, heat is applied to promote endothermic dehydration and formation of the polymer melt by polycondensation. The water of reaction is condensed and removed leaving the polyamide. The molecular weight and final properties of the polymer are controlled by choice and ratio of feedstock, heating rate, and judicious use of monofunctional acids and amines to terminate chain propagation. Generally an excess of polyamine is present to prevent runaway chain propagation. Unreacted amines can be removed by distillation, if desired. Often a solvent, such as an alcohol, is admixed with the final condensation reaction product to produce a liquid solution that can readily be handled. The condensation reaction generally is accomplished at a temperature of from about 225° F. to about 450° F. under a nitrogen sweep to remove the condensed water from the reaction. The polyamines can comprise, for example, ethylenediamine, diethylenetriamine, triethylene tetraamine, amino ethyl piperazine and the like.

The polyamides can be converted to quaternary compounds by reaction with methylene chloride, dimethyl sulfate, benzylchloride, diethyl sulfate and the like. Typically the quaternization reaction would be effected at a temperature of from about 100° to about 200° F. over a period of from about 4 to 6 hours.

The quaternization reaction may be employed to improve the chemical compatibility of the tackifying compound with the other chemicals utilized in the treatment fluids. Quaternization of the tackifying compound can reduce effects upon breakers in the fluids and reduce or minimize the buffer effects of the compounds when present in various fluids.

Additional compounds which may be utilized as tackifying compounds include liquids and solutions of, for example, polyesters and polycarbamates, polycarbonates, natural resins such as shellac and the like.

The tackifying compound is admixed with the particulate in an amount of from about 0.1 to about 3.0 percent active material by weight of the coated particulate. It is to be understood that larger quantities may be used, however, the larger quantities generally do not significantly increase performance and could undesirably reduce the permeability of the particulate pack. Preferably, the tackifying compound is admixed with the particulate introduced into the subterranean formation in an amount of from about 0.25 to about 2.0 percent by weight of the coated particulate.

When the tackifying compound is utilized with another material that is to be admixed with the particulate and which is to be at least partially coated with the tackifying compound, such as glass fibers or the like, the compound is present in an amount of from about 10 to about 250 percent active material by weight of the glass fibers or other added material and generally from about 0.1 to about 3 percent active material by weight of the quantity of particulate with which the coated material is intimately admixed. Preferably the tackifying compound is present in an amount of from about 50 to about 150 percent of the material which is to be at least partially coated with the tackifying compound and then added to the particulate. At least a portion of the tackifying compound introduced with the additional material will contact and coat at least a portion of the particulate with which it is admixed.

The hardenable resin comprises an epoxy or phenolic resin or other compound capable of being at least partially coated upon a particulate substrate and then cured to a higher degree of polymerization. Examples of such resins include phenol-aldehyde resins of both the resole and novolac type, urea-aldehyde resins, melamine-aldehyde resins, epoxy resins, furfuryl alcohol resins and the like. The curing may result from heating the resin to a higher temperature such as can occur with the resole resins or by the addition of a catalyst or crosslinker to the resin which initiates polymerization. Admixtures of resins such as the resole and novalac resins may be utilized wherein sufficient resole resin is incorporated to initiate polymerization in the novalac resin. Various resins are described in for example U.S. Pat. Nos. 5,420,174; 5,218,038; 5,425,994 and 4,888,240 the entire disclosures of which are incorporated herein by reference thereto. Particularly preferred resins include epoxy resins such as "EPON 828" epoxy resin from Shell Chemical Company, Houston, Tex. Phenolic resins such as "Resin 1866" from Acme Resin Corporation, Borden Division, Forrest Park, Ill., furan resins such as "ARS-1500" resin from Advanced Resin Systems, Des Plains, Ill. and novalac Resins such as "Bakelite 9282 FP" resin also available from Advanced Resin Systems.

The resin is admixed with the particulate in an amount of from about 0.01 to about 5.0 percent by weight of the particulate. Preferably, the resin is admixed with the particulate in an amount of from about 0.05 about 1.0 percent by weight of the particulate. Curing agents, catalysts or crosslinkers selected from those well known in the art may be utilized with the resin to harden the resin and form a consolidated matrix of particulate.

The liquid or solution of tackifying compound interacts mechanically with the particles of particulate introduced into the subterranean formation to limit or prevent the flowback of particulates to the wellbore during initial flowback prior to hardening and consolidation of the particulates by the hardenable resin.

In one embodiment, the tackifying compound, when comprised of polyamides, may be admixed and contacted with a material that has multi-functional reactive sites which are capable of reacting with the tackifying compound to form a hard reaction product which consolidates the agglomerates formed by the tackifying compound. A "hard reaction product" as used herein means that the reaction of the tackifying compound with the multifunctional material will result in a substantially nonflowable reaction product that exhibits a higher compressive strength in a consolidated agglomerate than the tackifying compound alone with the particulates. One means of evaluating the consolidated agglomerate to determine whether an increase in compressive strength has occurred is through testing with a penetrometer. Samples may be prepared comprising particulate coated with the tackifying compound, multifunctional material and an admixture as described herein and penetrometer readings can be made using equipment such as a PWG Penetrometer from Precision Scientific Company, Chicago, Ill. Comparison of the penetrometer readings readily demonstrates the change that has occurred as a result of the reaction. In this instance, the tackifying compound also functions as the hardenable resin. The material having multi-functional reactive sites include compounds such as aldehydes such as formaldehyde, dialdehydes such as glutaraldehyde, hemiacetals or aldehyde releasing compounds, diacid halides, dihalides such as dichlorides and dibromides, polyacid anhydridesa such as citric acid, epoxides and the like. Preferred compounds for use with polyamides comprise furfuraldehyde, glutaraldehyde or aldehyde condensates and the like. The multi-functional compound is admixed with the tackifying compound in an amount of from about 0.01 to about 50 percent by weight of the tackifying compound to effect formation of the reaction product. Preferably, the compound is present in an amount of from about 0.5 to about 1 percent by weight of the tackifying compound.

The liquid or solution of tackifying compound and hardenable resin generally are incorporated with the particulate in any of the conventional fracturing or gravel packing fluids comprised of an aqueous fluid, an aqueous foam, a hydrocarbon fluid or an emulsion, a viscosifying agent and any of the various known breakers, buffers, surfactants, clay stabilizers or the like.

Generally the tackifying compound and hardenable resin may be incorporated into fluids having a pH in the range of from about 3 to about 12 for introduction into a subterranean formation. The compounds are useful in reducing particulate movement within the formation at temperatures from about ambient to in excess of 300° F. It is to be understood that not every hardenable resin or tackifying compound will be useful over the entire pH or temperature range but every compound is useful over at least some portion of the range and individuals can readily determine the useful operating range for various products utilizing well known tests and without undue experimentation.

The liquid or solution of tackifying compound and the hardenable resin generally are incorporated with the particulate as a simultaneous mixture by introduction into the fracturing or gravel packing fluid along with the particulate. Fracturing fluid slurries are introduced into the subterranean formation at a rate and pressure sufficient to create at least one fracture in the formation into which particulate then is introduced to prop the created fracture open to facilitate hydrocarbon production. Gravel packing treatments generally are performed at lower rates and pressures whereby the fluid can be introduced into a formation to create a controlled particle size pack surrounding a screen positioned in the wellbore where fracturing of the formation may or may not occur. The particulate pack surrounding the wellbore then functions to prevent fines or formation particulate migration into the wellbore with the production of hydrocarbons from the subterranean formation.

The gravel packing treatment also may be performed without a screen in the wellbore. In such a screenless completion, the fluid generally is introduced into the wellbore to fill the perforations and wellbore to a level above the perforations and permitted to consolidate. The consolidated pack can then be drilled or reamed out to reopen the bore while providing a consolidated pack to screen fines and formation particulate from migrating into the wellbore.

The tackifying compound may be introduced into the fluid before, after or simultaneously with introduction of the particulate into the fluid. The liquid or solution may be incorporated with the entire quantity of particulate introduced into the subterranean formation or it may be introduced with only a portion of the particulate, such as in the final stages of the treatment to place the intimate mixture in the formation in the vicinity of the wellbore. For example, the tackifying compound may be added to only the final 20 to 30 percent of the particulate laden fluid introduced into the formation and the hardenable resin may be added to only the last 10 to 20 percent of the particulate laden fluid. In this instance, the intimate mixture will form a tail-in to the treatment which upon interaction within the formation with the particulate will cause the particles to bridge on the agglomerates formed therein and prevent movement of the particles into the wellbore with any produced fluids. The tackifying compound and hardenable resin may be introduced into the blender or into any flowline in which they will contact the material to be at least partially coated by the compounds. The compounds may be introduced with metering pumps or the like prior to entry of the treatment fluid into the subterranean formation.

In an alternate embodiment, the particulate may be premixed with either the tackifying compound or the hardenable resin prior to admixing with a treatment fluid and the other constituents for use in a subterranean formation. In some instances, resin precoated particulates may be utilized and the tackifying compound then would be added during performance of the subterranean formation treatment. Depending upon the type of resin coating employed, a catalyst then would be added to the treatment fluid or introduced in a flush fluid or the like.

Surprisingly, it has been found that use of the method of the present invention can produce high permeability tunnels extending from wellbore perforations back into proppant packed fractures created in the subterranean formation which then may be consolidated. Control of the flowback rate of the treatment or formation fluids from the wellbore can be used to provide a controlled erosion of the treated particulate immediately adjacent a perforation in the wellbore. The flowback rate is controlled so as to provide a level above the initial critical resuspension velocity of the tackifying compound but generally is maintained below the continuous critical resuspension velocity. This results in controlled production of particulate from the formation. The erosion surprisingly has been found to be very uniform in nature and to create a tunnel into the particulate in the formation generally corresponding to the size and shape of the perforation in the wellbore. After the tunnel is formed, the hardenable resin consolidates the remaining particulate to provide a high permeability passage or tunnel from the formation to the wellbore.

To further illustrate the present invention and not by way of limitation, the following examples are provided.

EXAMPLE I

The evaluation of a liquid or solution of a compound for use as a tackifying compound is accomplished by the following test. A critical resuspension velocity is first determined for the material upon which the tackifying compound is to be coated. The apparatus comprises a ½" glass tee which is connected to an inlet source of water and an outlet disposal line is blocked to fluid flow. A water slurry of particulate is aspirated into the tee through inlet and collected within a lower portion of said tee by filtration against a screen. When the lower portion of the tee is full, the vacuum source is removed and a plug is used to seal the end of the lower portion of the tee. The flow channel from inlet to outlet then is swabbed clean and a volumetrically controlled pump, such as a "MOYNO" pump, is connected to the inlet and a controlled flow of water is initiated. The velocity of the fluid is slowly increased through the inlet until the first particule of particulate material is picked up by the flowing water stream. This determines the baseline for the starting of the resuspension velocity. The flow rate then is further increased until the removal of particles becomes continuous. This determines the baseline for the continuous resuspension velocity. The test then is terminated and the apparatus is refilled with particulate having a coating corresponding to about 0.5 percent active material by weight of the particulate applied thereto. Similar trends generally are seen in the results when the concentrations tested are from about 0.1 to about 3 percent, however, the 0.5 percent level which is within the preferred application range is preferred for standardization of the procedure. The test is repeated to determine the starting point of particulate removal and the velocity at which removal becomes continuous. The percent of velocity increase (or decrease) then is determined based upon the initial or continuous baseline value. The results of several tests employing the preferred polyamide of the present invention, and conventional epoxy and phenolic resins known for use in consolidation treatments in subterranean formations with 12/20 and 20/40 mesh sand are set forth below in Table I.

TABLE I

| Test No. | Particulate Size | Coating Agent, % V/Wt Particulate | Percent Of Velocity Change At: | |
|---|---|---|---|---|
| | | | Starting of Sand Particle Transport | Continuous Sand Transport |
| 1 | 20/40/mesh sand | none | 0 | |
| 2 | 20/40 mesh sand | 1/2 percent polyamide | 192 | 222 |
| 3 | 20/40 mesh sand | 1 percent polyamide | 271 | 391 |
| 4 | 20/40 mesh sand | 1/2 percent phenolic | −0.5 | 6.5 |
| 5 | 20/40 mesh sand | 1 percent phenolic | −9 | −6.8 |
| 6 | 20/40 mesh sand | 1/2 percent epoxy | −9 | −1.2 |
| 7 | 20/40 mesh sand | 1 percent epoxy | 5.2 | 12.2 |
| 8 | 12/20 mesh sand | 1/2 percent polyamide | 228 | 173 |
| 9 | 12/20 mesh sand | 1 percent polyamide | 367 | 242 |
| 10 | 12/20 mesh sand | 1/2 percent phenolic | 42 | 22 |
| 11 | 12/20 mesh sand | 1 percent phenolic | 42 | 13 |
| 12 | 12/20 mesh sand | 1/2 percent epoxy | 48 | 30 |
| 13 | 12/20 mesh sand | 1 percent epoxy | 38 | 15 |

The data clearly illustrates the substantial increase in the critical resuspension velocity of a particulate coated with the tackifying compound in comparison to other known formation consolidation agents which require hardening to be effective.

The test results clearly demonstrate the beneficial results achieved by practice of the method of the present invention with respect to proppant production from a simulated formation.

EXAMPLE II

The stabilization properties of the method of the present invention are determined by comparison to untreated sand and sand including a tackifying compound. The flowback velocity is measured in an American Petroleum Institute approved simulated fracture flow cell. The cell contains Ohio sandstone cores having a proppant bed size of about 1.5 inches in height, about 7 inches in length and about 0.25 inches in width between the cores. The bed is initially prepacked with 20/40 mesh sand by introducing the sand into the cell in an aqueous slurry or a gelled fluid containing 40 pounds of guar per 1000 gallons of aqueous fluid. The cell is fitted with a 0.3 inch hole at one end to simulate a perforation. The hole is visible through a sight glass so that proppant production through the hole can be visually determined.

The cell then was cleaned and packed with another proppant pack for testing. The tested materials are set forth in Table II, below.

While the present invention has been described with regard to that which is currently considered to comprise the preferred embodiments of the invention, other embodiments have been suggested and still other embodiments will occur to those individuals skilled in the art upon receiving the foregoing specification. It is intended that all such embodiments shall be included within the scope of the present invention as defined by the claims appended hereto.

TABLE II

| SAMPLE | PACKING FLUID | ADDITIVES TO SAND, % BY WT. SAND | FLOW RATE, ml/min AT WHICH FAILURE OCCURS |
|---|---|---|---|
| 1 | water | none | 84 |
| 2 | gel | none | 90 |
| 3 | gel | 1% by wt polyamide | 180 |
| 4 | gel | 2% by wt polyamide | 384 |
| 5 | gel | 1% by wt polyamide and 1% out Bakelite 9282 FP resin | >3000[1] |
| 6 | gel | 1% by wt polyamide and 1% by wt Bakelite 9282 FP resin | >2600[2] |

[1]pack heated at 250° F. for 72 hours before testing, no sand production during test
[2]pack heated at 180° F. for 4 hours before testing no sand production during test

What is claimed is:

1. A method of treating a subterranean formation comprising the steps of:
   introducing a particulate-containing fluid suspension into a subterranean formation;
   admixing with at least a portion of said particulate in said fluid suspension a liquid or solution of a tackifying compound whereby at least a portion of said particulate is at least partially coated by said compound;
   admixing with at least a portion of said particulate in said fluid suspension a hardenable resin whereby at least a portion of said particulate is at least partially coated by said resin;
   depositing the tackifying compound and hardenable resin coated particulates in the subterranean formation; and
   flowing back fluid from the formation whereby the tackifying compound coated particulate retards movement of at least a portion of the particulate within said formation and said hardenable resin subsequently consolidates at least a portion of the particulate within said formation.

2. The method of claim 1 wherein said tackifying compound comprises predominately a condensation reaction product of a dimer acid containing some trimer and higher oligomers and some monomer acids with a polyamine.

3. The method of claim 2 wherein said polyamine comprises at least one member selected from the group of ethylenediamine, diethylenetriamine, triethylenetetraamine, tetraethylene pentaamine and aminoethylpiperazine.

4. The method of claim 1 wherein said hardenable resin comprises at least one member selected from the group of phenol-aldehyde resins, urea-aldehyde resins, melamine-aldehyde resins, epoxy resins and furfuryl alcohol resins.

5. The method of claim 1 wherein said hardenable resin is a reaction product of the tackifying compound and a multifunctional material comprising at least one member selected from the group of dialdehydes, diacid halides, dihalides, and polyacid anhydrides.

6. A method of treating a subterranean formation comprising the steps of:
   introducing a treatment fluid into a subterranean formation;

admixing with at least a portion of said fluid, a particulate which is introduced into and deposited within said formation;

admixing with at least a portion of said particulate a liquid or solution of a tackifying compound whereby at least a portion of said particulate is at least partially coated by said compound such that the critical resuspension velocity of said at least partially coated particulate is increased by at least about 50 percent when tested at a level of 0.5% active material by weight over said particulate alone with water;

admixing with at least a portion of said particulate in said treatment fluid a hardenable resin whereby at least a portion of said particulate is at least partially coated by said resin;

depositing the tackifying compound and hardenable resin coated particulates in the subterranean formation; and flowing back fluid from the formation whereby the tackifying compound coated particulate retards movement of at least a portion of the particulate within said formation and said hardenable resin subsequently consolidates at least a portion of the particulate within said formation.

7. The method of claim 6 wherein said tackifying compound is admixed with said particulate in an amount of from about 0.1 to about 3.0 percent by weight of said particulate.

8. The method of claim 6 wherein said tackifying compound is admixed with said particulate in an amount of from about 0.25 to about 2 percent by weight of said particulate.

9. The method of claim 6 wherein said coated particulate has a critical resuspension velocity in excess of 100 percent over said particulate alone.

10. The method of claim 6 wherein said tackifying compound comprises a liquid or solution of a polyamide.

11. The method of claim 6 wherein said tackifying compound comprises predominately a condensation reaction product of a dimer acid containing some trimer and higher oligomers and some monomer acids with a polyamine.

12. The method of claim 11 wherein said polyamine comprises at least one member selected from the group of ethylenediamine, diethylenetriamine, triethylenetetraamine, tetraethylene pentaamine and aminoethylpiperazine.

13. The method of claim 11 wherein said tackifying compound has been quaternized.

14. The method of claim 6 wherein said hardenable resin comprises at least one member selected from the group of phenol-aldehyde resins, urea-aldehyde resins, melamine-aldehyde resins, epoxy resins and furfuryl alcohol resins.

15. The method of claim 6 wherein said hardenable resin is a reaction product of the tackifying compound and a multifunctional material comprising at least one member selected from the group of dialdehydes, diacid halides, dihalides, and polyacid anhydrides.

16. A method of treating a subterranean formation penetrated by a wellbore comprising the steps of:

providing a fluid suspension including a mixture of a particulate material and another material selected from the group of particles comprising metal, natural or synthetic polymers, ceramics and glass which are at least partially coated with a liquid or solution of a tackifying compound and a hardenable resin;

introducing the fluid suspension into a subterranean formation through a wellbore;

depositing the fluid suspension in the formation; and flowing back fluid from the formation whereby the tackifying compound material retards movement of at least a portion of the particulate material from the formation into the wellbore and said hardenable resin subsequently consolidates at least a portion of the particulate material within said formation.

17. The method of claim 16 wherein said another material is in the form of fibers, beads, ribbons, flakes, platelets or shavings.

18. The method of claim 16 wherein said another material is present in an amount of from about 0.1 to about 5% by weight of the particulate material.

19. The method of claim 16 wherein said tackifying compound is present in an amount of from about 0.1 to about 3% by weight of said particulate.

20. The method of claim 16 wherein said tackifying compound comprises a liquid or solution of a polyamide.

21. The method of claim 16 wherein said hardenable resin comprises at least one member selected from the group of phenol-aldehyde resins, urea-aldehyde resins, melamine-aldehyde resins, epoxy resins and furfuryl alcohol resins.

22. The method of claim 16 wherein said tackifying compound at least one member selected from the group of a liquid or solution of a polyester, a polycarbonate polycarbamate and a natural resin.

23. A method of treating a subterranean formation penetrated by a wellbore having perforations therein comprising the steps of:

introducing a particulate-containing fluid into a subterranean formation;

admixing with at least a portion of said particulate in said fluid suspension a liquid or solution of a tackifying compound whereby at least a portion of said particulate is at least partially coated by said compound;

providing a quantity of a hardenable resin coated particulate in said fluid suspension;

depositing the tackifying compound and hardenable resin coated particulates in the subterranean formation controllably flowing back fluid from the subterranean formation whereby erosion tunnels are formed in the particulate deposited in the formation adjacent the perforations; and consolidating said particulates in said formation by subsequent hardening of said hardenable resin whereby high permeability flow tunnels are produced which connect said formation with said wellbore.

24. The method of claim 23 wherein said tackifying compound comprises a liquid or solution of a polyamide.

25. The method of claim 23 wherein said hardenable resin is a reaction product of the tackifying compound and a multifunctional material comprising at least one member selected from the group of aldehydes, dialdehydes, hemiacetals, diacid halides, dihalides, epoxides, and polyacid anhydrides.

* * * * *